(12) United States Patent
Csapo et al.

(10) Patent No.: US 7,453,858 B2
(45) Date of Patent: *Nov. 18, 2008

(54) APPARATUS AND METHOD FOR ADAPTING WI-FI ACCESS POINT TO WIRELESS BACKHAUL LINK OF A WIRELESS NETWORK

(75) Inventors: John S. Csapo, Dallas, TX (US); Sudhindra P. Herle, Plano, TX (US); Joseph R. Cleveland, Richardson, TX (US); Bryan J. Moles, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 842 days.

This patent is subject to a terminal disclaimer.

(21) Appl. No.: 10/795,117

(22) Filed: Mar. 5, 2004

(65) Prior Publication Data

US 2004/0253984 A1 Dec. 16, 2004

Related U.S. Application Data

(63) Continuation-in-part of application No. 10/284,674, filed on Oct. 31, 2002.

(51) Int. Cl.
*H04Q 7/24* (2006.01)

(52) U.S. Cl. .............. 370/338; 370/335; 370/401; 370/232; 370/468; 455/556.1

(58) Field of Classification Search .............. 370/335, 370/338, 401, 232, 468; 455/556.1
See application file for complete search history.

(56) References Cited

U.S. PATENT DOCUMENTS

| | | | |
|---|---|---|---|
| 6,522,628 B1* | 2/2003 | Patel et al. | 370/230.1 |
| 2003/0112354 A1* | 6/2003 | Ortiz et al. | 348/333.01 |
| 2003/0161341 A1* | 8/2003 | Wu et al. | 370/448 |
| 2003/0174667 A1* | 9/2003 | Krishnamurthi et al. | 370/328 |
| 2003/0202524 A1* | 10/2003 | Conner et al. | 370/408 |
| 2004/0141522 A1* | 7/2004 | Texerman et al. | 370/466 |

* cited by examiner

*Primary Examiner*—Dwayne D. Bost
*Assistant Examiner*—Pierre-Louis Desir

(57) ABSTRACT

An access point for communicating with mobile stations in an integrated wireless network. The access point comprises a first transceiver for communicating with selected mobile stations within a short distance of the access point and an input/output interface that couples the access point to an external mobile station via a communication bus. The externally coupled mobile station communicates with a first base station in a wireless public network. The access point further comprises a data processor that communicates with the externally coupled mobile station via the input/output interface and interconnection circuitry that transfers data traffic between the first transceiver and the data processor. The access point enables the selected mobile stations to communicate with the first base station via the externally coupled mobile station.

21 Claims, 5 Drawing Sheets

APPARATUS AND METHOD FOR ADAPTING WI-FI ACCESS POINT TO WIRELESS BACKHAUL LINK OF A WIRELESS NETWORK

CROSS-REFERENCE TO RELATED APPLICATIONS

The present invention is a continuation-in-part of U.S. patent application Ser. No. 10/284,674, entitled "INTEGRATED WI-FI AND WIRELESS PUBLIC NETORK AND METHOD OF OPERATION," filed on Oct. 31, 2002. Patent application Ser. No. 10/284,674 is assigned to the assignee of the present application. The subject matter disclosed in patent application Ser. No. 10/284,674 is hereby incorporated by reference into the present disclosure as if fully set forth herein.

TECHNICAL FIELD OF THE INVENTION

The present invention is directed, in general, to wireless networks and, more specifically, to an integrated 802.xx (WI-FI) and wireless public network.

BACKGROUND OF THE INVENTION

The radio frequency (RF) spectrum is a limited commodity. Only a small portion of the spectrum can be assigned to each communications industry. The assigned spectrum, therefore, must be used efficiently in order to allow as many frequency users as possible to have access to the spectrum. Multiple access modulation techniques are some of the most efficient techniques for utilizing the RF spectrum. Examples of such modulation techniques include time division multiple access (TDMA), frequency division multiple access (FDMA), and code division multiple access (CDMA).

There is a wide variance in the performance of wireless networks. A conventional public wide area network (WAN), such as a CDMA cellular network, covers a large geographical area (on the order of 1 to 100 plus square miles), but has a relatively low bit-rate between each mobile station and each base station. These public wireless networks use regulated portions of the radio spectrum and are shared by many users. The infrastructure costs of public wireless networks are relatively high due to the size and complexity of the base station equipment.

Newer wireless networks, such as CDMA2000-EV/DV or 1XEV/DO networks, offer higher bit-rates (on the order to 2.4 MBps) and enhanced data services, such as web browsing. However, these networks also pack many users into a relatively small portion of the regulated spectrum. Still other types of radio networks, such as wireless local area networks (WLANs) or wireless personal area networks (WPANs) try to increase the throughput or bit-rate in unregulated spectrum and smaller coverage areas. For example, a WLAN IEEE-802.11 (or WI-FI) network may transmit at speeds up to 11 Mbps in Direct Sequence Spread Spectrum (DSSS) mode or at speeds up to 54 Mbps in Orthogonal Frequency Division Multiplexing (OFDM) mode. For the purposes of this application and the claims herein, the term "IEEE 802.11" includes the different versions of the IEEE 802.11 standard (e.g., IEEE 802.11a, IEEE 802.11b, IEEE 802.11g, etc.).

However, an access point (or base station) in an IEEE 802.11 network may cover an area only a few hundred feet in diameter. In conventional network, each access point is connected to the core network (e.g., Internet) by, for example, a wireline Ethernet connection, a wireline backhaul connection, or a point-to-point wireless connection. In order to cover the same geographical area as a base station of a public wireless network, a large number of IEEE 802.11 network access points and a large wireline backhaul network are required. The resulting IEEE 802.11 based network may be more expensive to set up and operate (due to backhaul cost) than the public wireless network. Thus, there are always tradeoffs between and among the coverage areas, the maximum bit-rates, and the costs of different types of wireless networks.

Therefore, there is a need in the art for an improved wireless network architecture that overcomes the limitations of the above-described conventional wireless networks. In particular, there is a need for a wireless network that provides IEEE 802.11 (or equivalent) communication services to mobile stations or access terminals over a relatively large geographical area, without incurring the costs of a large wireline backhaul network to couple all of the IEEE 802.11 (or equivalent) access points to a core network.

SUMMARY OF THE INVENTION

To address the above-discussed deficiencies of the prior art, it is a primary object of the present invention to provide an access point for communicating with mobile stations located in a coverage area of an integrated wireless network. According to an advantageous embodiment of the present invention, the access point comprises: 1) a first transceiver capable of communicating with selected ones of the mobile stations or access terminals within a short distance of the access point; 2) an input/output interface capable of coupling the access point to an external mobile station via a communication bus, wherein the externally coupled mobile station is capable of communicating with a first base station in a wireless public network portion of the integrated wireless network; 3) a data processor capable of communicating with the externally coupled mobile station via the input/output interface; and 4) interconnection circuitry capable of transferring data traffic between the first transceiver and the data processor, such that the access point enables the selected mobile stations to communicate with the first base station via the externally coupled mobile station.

According to one embodiment of the present invention, the first transceiver communicates with the selected mobile stations or access terminals using an IEEE 802.11 wireless protocol, an IEEE 802.15 wireless protocol, or other WLAN or WPAN protocol.

According to another embodiment of the present invention, the externally coupled mobile station communicates with the first base station using a CDMA2000, 1XEV/DO (IS-856), EDGE, WCDMA, IEEE 802.16e or other wireless cellular protocol.

According to still another embodiment of the present invention, the data processor is capable of receiving from the first transceiver data traffic received from at least two mobile stations and transmitting the data traffic received from at least two mobile stations to the externally coupled mobile station for subsequent transmission to the first base station in a single channel using the CDMA2000, 1XEV/DO (IS-856), IEEE 802.16e or other cellular wireless protocol.

According to yet another embodiment of the present invention, the first transceiver is capable of communicating with the selected mobile stations within 500 feet of the access point.

According to a further embodiment of the present invention, the access point further comprises an access point-to-access point (AP-AP) interface capable of transmitting to a second access point first data received from a first selected mobile station by the first transceiver, wherein the first data is directed to a second mobile station in communication with the second access point.

According to a still further embodiment of the present invention, the AP-AP interface is further capable of receiving second data from the second access point and transferring the second data to the first transceiver for subsequent transmission to the first selected mobile station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
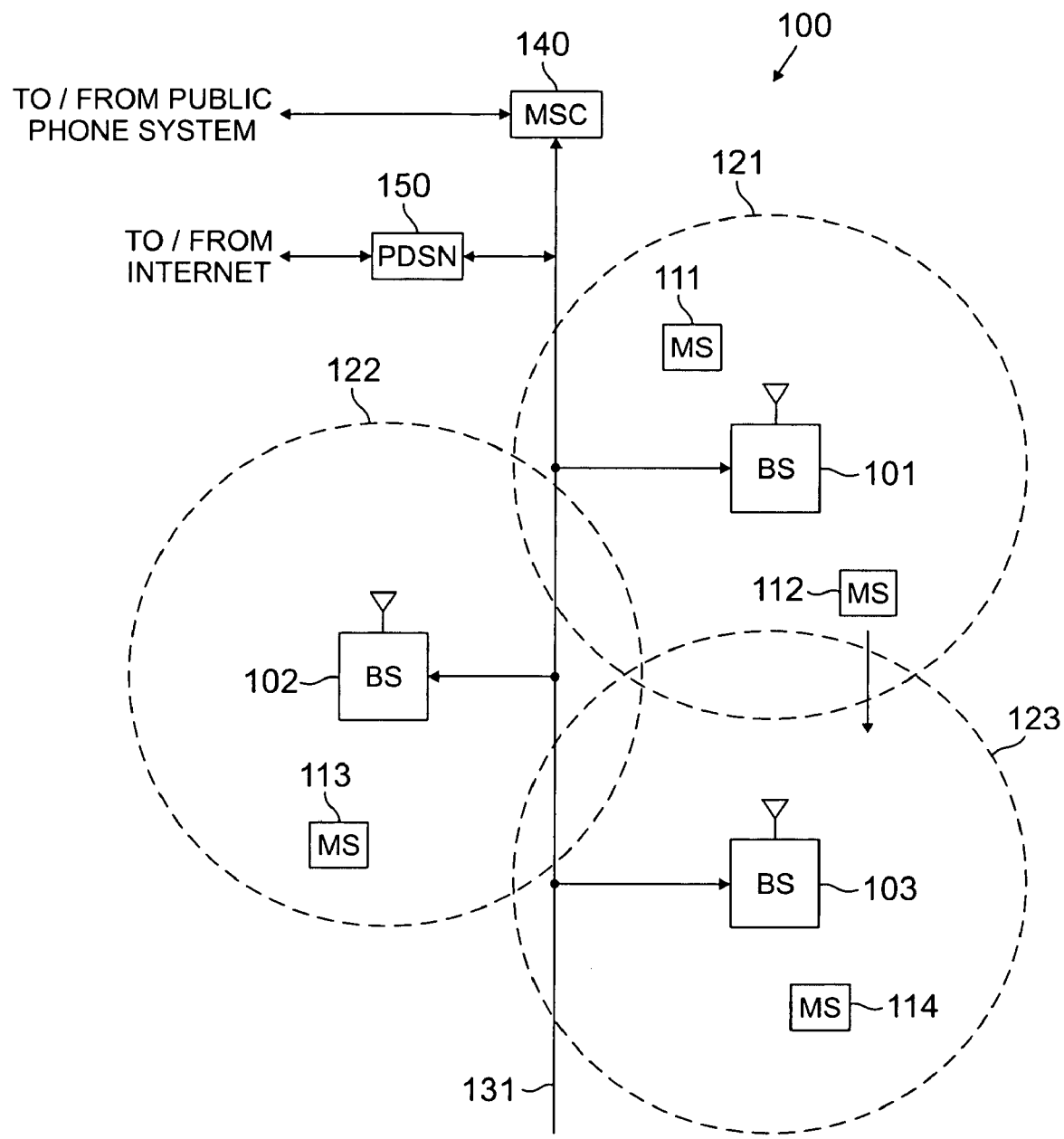
FIG. 1 illustrates a conventional wireless network according to the principles of the prior art.

FIG. 1 illustrates conventional wireless network 100 according to the principles of the prior art. Wireless network 100 comprises a plurality of cell sites 121-123, each containing one of the base stations, BS 101, BS 102, or BS 103. Base stations 101-103 communicate with a plurality of mobile stations (MS) 111-114 over, for example, code division multiple access (CDMA) channels. Mobile stations 111-114 may be any suitable wireless communication devices, including conventional cellular telephones, Personal Communications System (PCS) handset devices, portable computers, telemetry devices, personal digital assistants, and the like, that are capable of communicating with the base stations via wireless radio links. Other types of access terminals, including fixed access terminals, may also be present in wireless network 100. However, for the sake of simplicity, only mobile stations are shown.

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors.

Each one of the prior art base stations BS 101, BS 102, and BS 103 may comprise a base station controller (BSC) and one or more separate base transceiver subsystems (BTS). Base station controllers and base transceiver subsystems are well known to those skilled in the art. A base station controller is a device that manages wireless communications resources, including the base transceiver stations, for specified cells within a wireless communications network. A base transceiver subsystem comprises the radio frequency (RF) transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of wireless network 100, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public switched telephone network (PSTN) and/or the Internet (not shown).

Communications line 131 links each vocoder in the base station controller (BSC) with switch elements in the mobile switching center (MSC) 140. Each link provides a digital path for transmission of voice signals in the pulse code modulation (PCM) format. Communications line 131 may be any suitable connection means, including a T1 line, a T3 line, a fiber optic link, a network backbone connection, and the like. In some embodiments, communications line 131 may be several different data links, where each data link couples one of BS 101, BS 102, or BS 103 to MSC 140.

BS 101, BS 102 and BS 103 transfer data signals, such as packet data, between each other and the Internet or other packet data network (not shown) via communications line 131 and packet data serving node (PDSN) 150. Packet data serving node (PDSN) 150 is well known to those skilled in the art.

Communications line 131 also provides a connection path to transfer control signals between MSC 140 and BS 101, BS 102 and BS 103 used to establish connections for voice and data circuits between MSC 140 and BS 101, BS 102 and BS 103. Those skilled in the art will recognize that the connections on communications line 131 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on communications line 131 may provide a transmission path for transmission of analog or digital control signals in a suitable signaling protocol.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located in cell site 121 close to the edge of cell site 123. The direction arrow proximate MS 112 indicates the movement of MS 112 towards cell site 123. At some point, as MS 112 moves into cell site 123 and out of cell site 121, a handoff will occur.

As is well known to those skilled in the art, the handoff procedure transfers control of a call from a first cell site to a second cell site. A handoff may be either a "soft handoff" or a "hard handoff." In a "soft handoff" a connection is made between the mobile station and the base station in the second cell before the existing connection is broken between the mobile station and the base station in the first cell. In a "hard handoff" the existing connection between the mobile station and the base station in the first cell is broken before a new connection is made between the mobile station and the base station in the second cell. An idle handoff is a handoff between cells of a mobile device that is communicating in the control or paging channel, rather than transmitting voice and/or data signals in the regular traffic channels.

Prior art wireless network 100 may be improved by integrating the conventional large cell size base stations with a number of small cell size access points, such as IEEE 802.11 access points. According to the principles of the present invention, a mobile station in the coverage area of the improved integrated wireless network accesses an IEEE 802.11 access point first (i.e., by default) and accesses a base station only if the mobile station fails to access the IEEE 802.11 access point. Each access point has a first wireless interface (e.g., an IEEE 802.11 interface) that communicates with mobile stations and a second wireless interface (e.g., a CDMA2000, CDMA2000-EV/DO, 1XEV/DO, EDGE, WCDMA, or IEEE 802.16e interface) that communicates with the base stations of conventional wireless network 100. The second wireless interface acts as a backhaul connection to relay mobile station traffic to the base stations.

Figure 2:
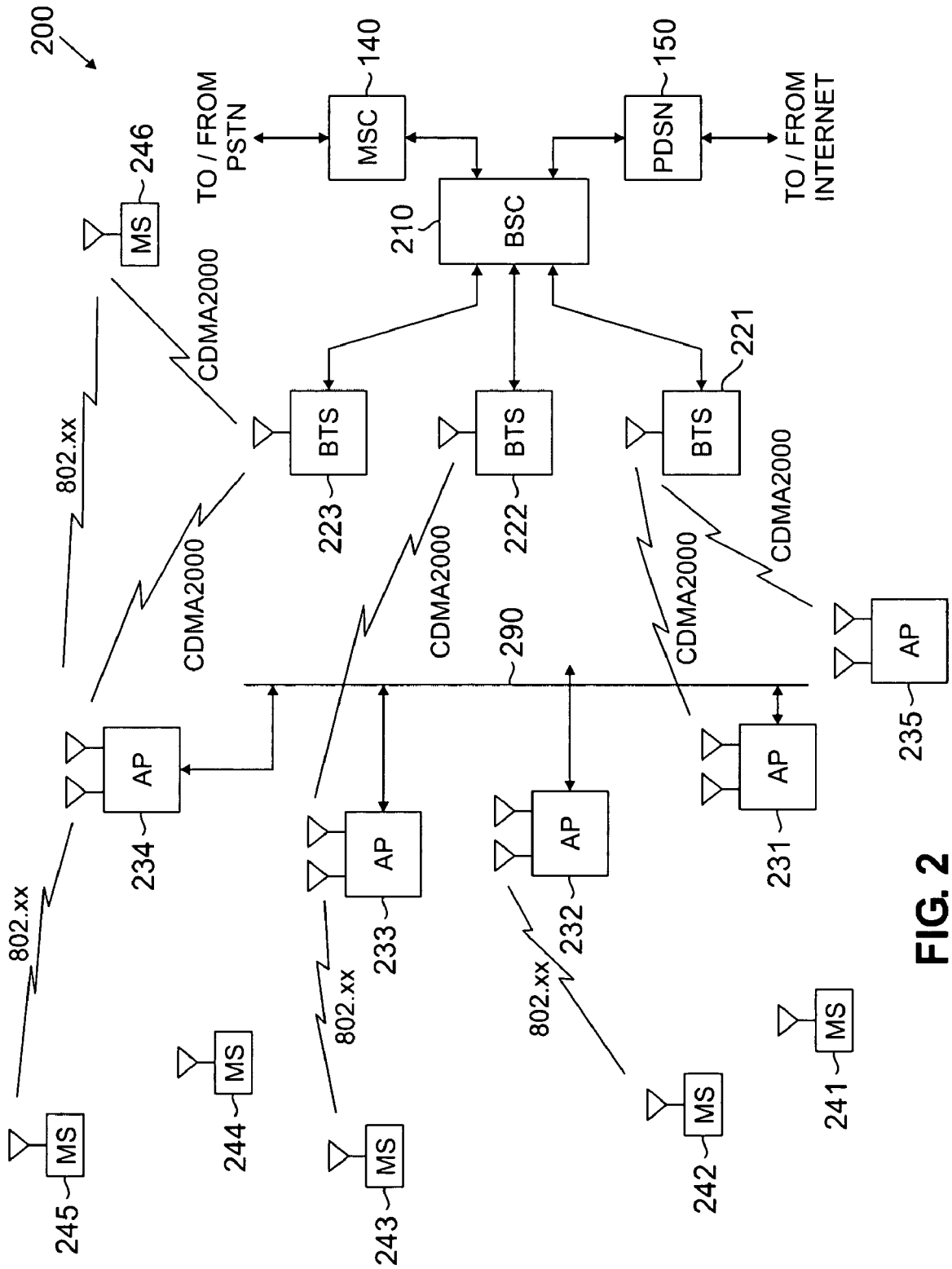
FIG. 2 illustrates selected portions of an exemplary wireless network according to an advantageous embodiment of the present invention.

FIG. 2 illustrates selected portions of exemplary wireless network 200 according to an advantageous embodiment of the present invention. Wireless network 200 is similar in many respects to wireless network 100 and comprises mobile switching center (MSC) 140, packet data serving node (PDSN) 150, and a plurality of base stations, such as BS 101-103 in FIG. 1. For ease of explanation, BS 101 is represented in FIG. 2 by base station controller (BSC) 210 and base transceiver subsystems 221-223. Base station controllers and base transceiver subsystems were discussed above in FIG. 1. Wireless network 200 further comprises access points (APs) 231-235 and communication line 290.

According to the principles of the present invention, access points 231-235 and base transceiver subsystems 221-223 are all capable of communicating with mobile stations 241-246. Access points 231-235 communicate with mobile stations 241-246 in a small coverage area by means of an IEEE 802.11, IEEE 802.15 (or equivalent WLAN or WPAN) air interface. For example, access point (AP) 231, access point (AP) 232, access point (AP) 233, access point (AP) 234, and access point (AP) 235 may be part of an IEEE 802.11 wireless local area network (LAN) in an office building. The maximum range of AP 231, AP 232, AP 233, and AP 234 coverage area may be limited to several hundred yards. Each of mobile stations 241-246 is capable of detecting and accessing one of AP 231, AP 232, AP 233, and AP 234, whenever the mobile station is sufficiently close to the access point. For example, mobile station (MS) 242 is capable of communicating with AP 232 via an IEEE 802.11 or IEEE 802.15 (or similar WLAN or WPAN) link. Similarly, mobile station (MS) 243 is capable of communicating with AP 233 via an IEEE 802.11 or IEEE 802.15 link and mobile station (MS) 246 is capable of communicating with AP 234 via an IEEE 802.11 or IEEE 802.15 (or similar WLAN or WPAN) link.

Additionally, base transceiver subsystems 221-223 communicate with mobile stations 241-246 in a larger coverage area by means of a CDMA2000, CDMA2000-EV/DV, 1X/EX/DV, EDGE, WCDMA, IEEE 802.16e (or equivalent) air interface. For example, base transceiver subsystem (BTS) 221, base transceiver subsystem (BTS) 222, and base transceiver subsystem (BTS) 223 may be part of a CDMA2000 or CDMA2000-EV/DV (hereafter, sometimes simply "CDMA2000") wireless public network that covers a metropolitan area of many square miles. The maximum range of each of BTS 221, BTS 222, and BTS 223 may be several miles. Each of mobile stations 241-246 is capable of detecting and accessing one of BTS 221, BTS 222, and BTS 223, whenever the mobile station is sufficiently close to the base transceiver subsystem. For example, mobile station (MS) 246 is capable of communicating with BTS 223 via a CDMA2000 link, an EDGE link, a WCDMA link, or an IEEE 802.16e link.

According to the principles of the present invention, each one of access points 231-234 also is capable of communicating with one or more of BTS 221-BTS 223 by means of a CDMA2000, 1X/EV/DO, EDGE, WCDMA, or IEEE 802.16e (or equivalent) air interface. This permits access points 231-234 to use the CDMA2000, 1X/EV/DO, EDGE, WCDMA, or IEEE 802.16e (or equivalent) air interface as a backhaul network to communicate with the public switched telephone network (via MSC 140) or with the Internet (via packet data server node (PDSN) 150). For example, AP 234 may communicate with MS 244, MS 245 and MS 246 via IEE 802.11 links and may communicate with BTS 223 via a CDMA2000 1X/EV/DO, EDGE, WCDMA, or IEEE 802.16e (or equivalent) link. Thus, AP 234 may act as an access concentrator by multiplexing and de-multiplexing data traffic to and from MS 244, MS 245, and MS 246 over the CDMA2000 link. This allows the CDMA2000 1X/EV/DO, EDGE, WCDMA, or IEEE 802.16e (or equivalent) air interface to be used more efficiently in wireless network 200. To facilitate this, according to the principles of the present invention, if a mobile station detects both an AP and a BTS, the mobile station will first attempt to access the AP. This allows the access points to concentrate the CDMA2000 1X/EV/DO, EDGE, WCDMA, or IEEE 802.16e (or equivalent) air interface traffic to the greatest extent possible.

Additionally, access points 231-234 may transfer data traffic between each other via communication line 290. This reduces the data traffic load on the CDMA2000 1X/EV/DO, EDGE, WCDMA, or IEEE 802.16e (or equivalent) air interface by eliminating intra-network data traffic. For example, MS 242 and MS 243 may communicate with each other through AP 232, AP 233, and communication 290 without involving any of BTS 221, BTS 222 and BTS 223. Furthermore, according to an exemplary embodiment of the present invention, communication line 290 may be replaced by a third air interface that handles only data traffic between access points. For example, AP 231-AP 234 may communicate with each other via an OFDM wireless interface. In still another exemplary embodiment of the present invention, AP235 has no line interface to other access points, but it communicates with BTS 221, BTS 222 and BTS 223 via CDMA 2000 1X/EV/DO, EDGE, WCDMA, or IEEE 802.16e (or equivalent) interface.

Figure 3:
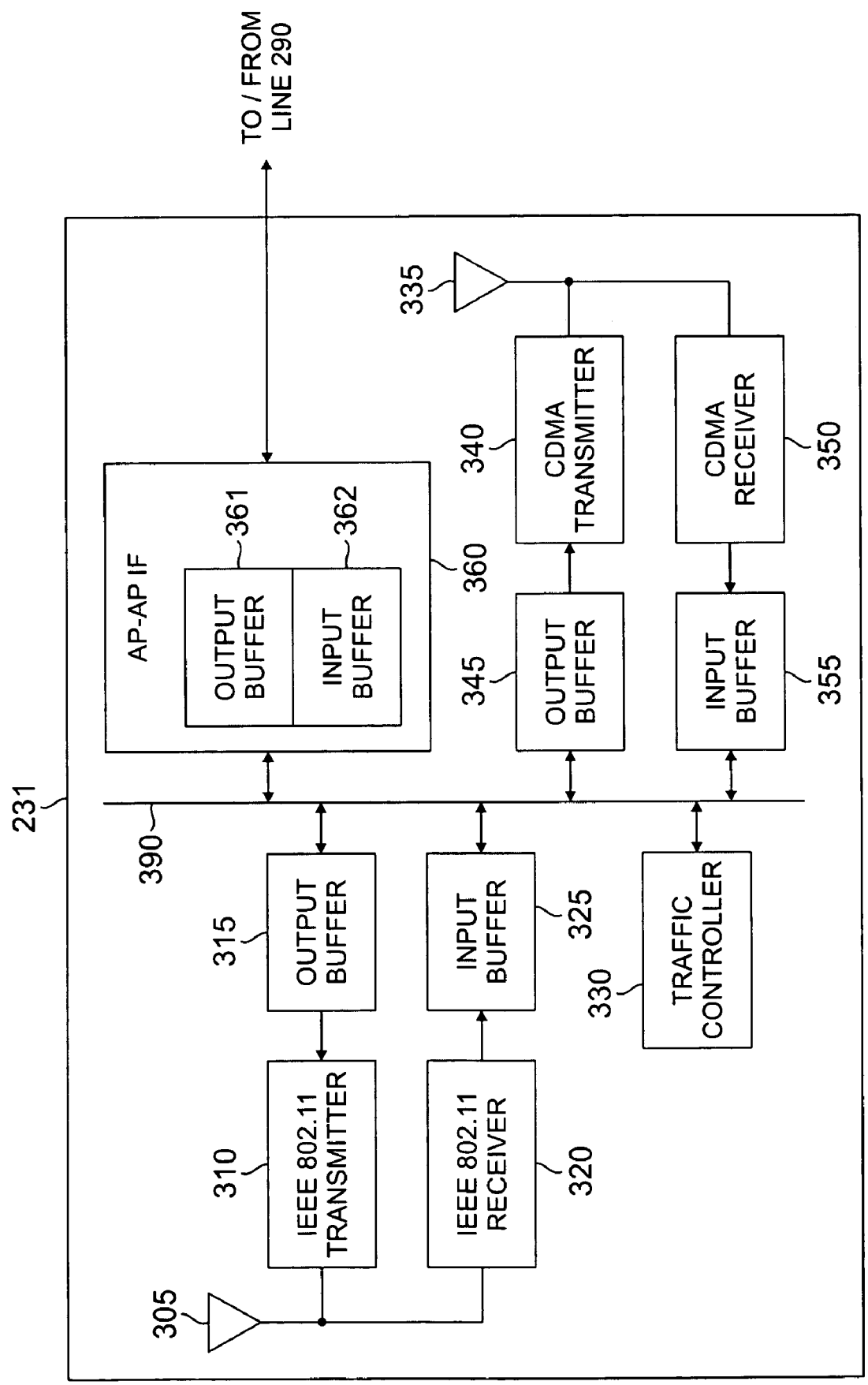
FIG. 3 illustrates in greater detail an access point in FIG. 2 according to an advantageous embodiment of the present invention.

FIG. 3 illustrates exemplary access point (AP) 231 in greater detail according to an advantageous embodiment of the present invention. Access point 231 comprises antenna 305, IEEE 802.11 transmitter block 310, output buffer 315, IEEE 802.11 receiver block 320, input buffer 325, and traffic controller 330. Access point 231 also comprises antenna 335, CDMA transmitter block 340, output buffer 345, CDMA receiver block 350, input buffer 355, and access point-to-access point (AP-AP) interface 360. AP-AP interface comprises output buffer 361 and input buffer 361. Output buffer 315, input buffer 325, traffic controller 330, output buffer 345, input buffer 355, and AP-AP interface 360 are coupled to, and communicate across, data bus 390.

Forward channel data traffic being transmitted to a mobile station is buffered in output buffer 315 and transmitted to a target mobile station via 802.11 transmitter 310 and antenna 305. Reverse channel data traffic is received from a mobile station by antenna 305 and 802.11 receiver 320 and is buffered in input buffer 325. Similarly, reverse channel data traffic being transmitted to a base transceiver subsystem (BTS) is buffered in output buffer 345 and transmitted to a target BTS via CDMA transmitter 340 and antenna 335. Forward channel data traffic is received from a BTS by antenna 335 and CDMA receiver 350 and is buffered in input buffer 355.

Data is transferred to communication line 290 by access point-to-access point (AP-AP) interface (IF) 360. Output buffer 361 buffers data being transferred to other access points and input buffer 362 buffers data being received from other access points. As noted above, in one embodiment of the present invention, communication line 290 may be replaced by a third air interface that handles only data traffic between access points or completely eliminated as in the case of AP 235. Thus, AP-AP IF 360 may be, for example, an OFDM wireless interface.

Traffic controller 330 directs the overall operation of exemplary AP 231. Traffic controller 330 is operable to combine data traffic from two or more IEEE 802.11 air interface links into a single data stream on a CDMA2000, 1X/EV/DO, EDGE, WCDMA, or IEEE 802.16e (or equivalent) air interface link. This enables AP 234 to act as an access concentrator.

Figure 4:
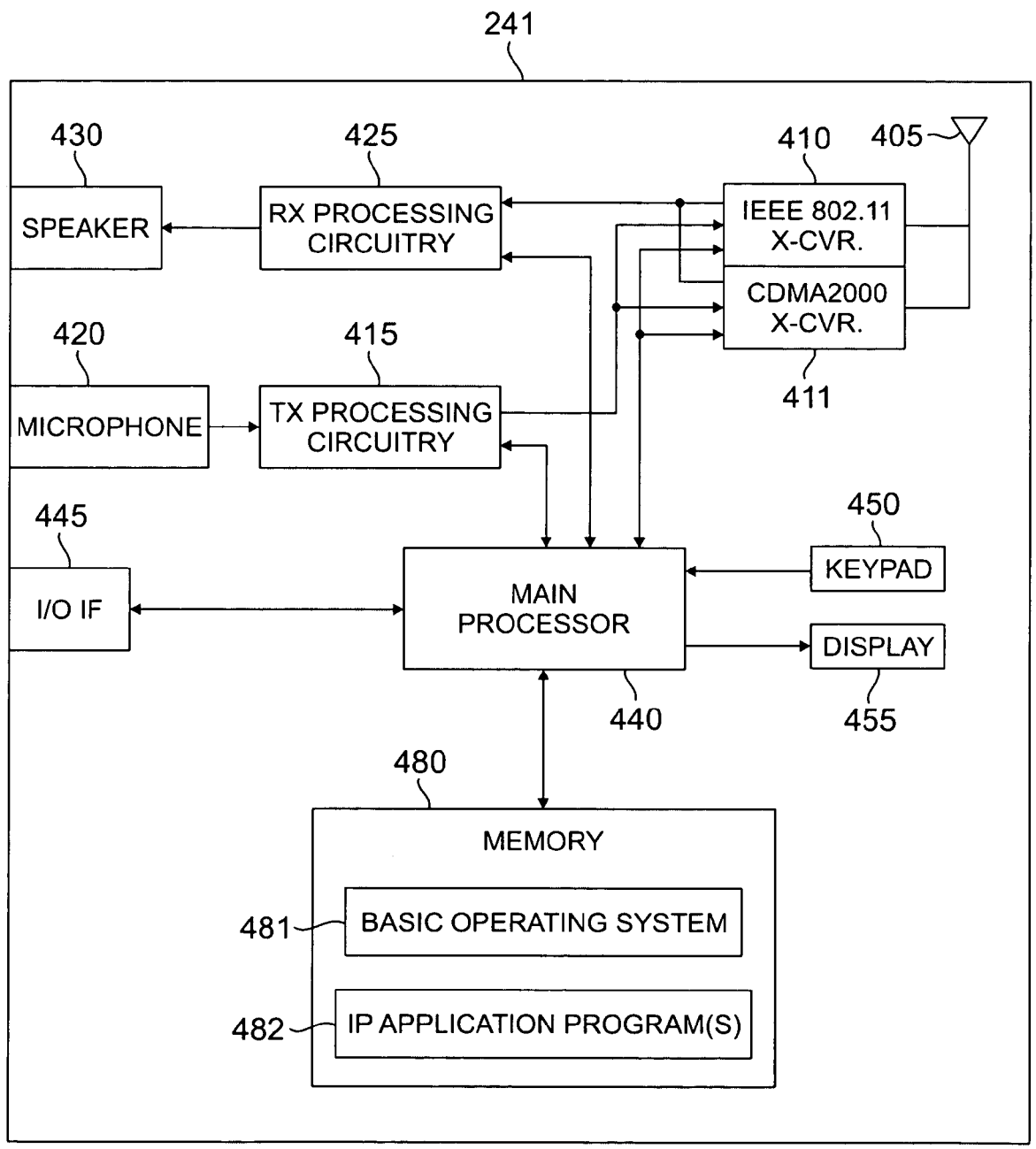
FIG. 4 illustrates in greater detail a dual mode mobile station capable of communicating with an exemplary wireless network according to an advantageous embodiment of the present invention.

FIG. 4 illustrates in greater detail exemplary dual mode mobile station 241 according to an advantageous embodiment of the present invention. Wireless mobile station 241 comprises antenna 405, 802.11 transceiver (X-CVR) 410, CDMA2000, 1X/EV/DO, EDGE, WCDMA, or IEEE 802.16e (or equivalent) transceiver 411, transmitter (TX) processing circuitry 415, microphone 420, receiver (RX) processing circuitry 425, speaker 430, main processor 440, input/output (I/O) interface (IF) 445, keypad 450, and display 455. Wireless mobile station 241 further comprises memory 480, which stores basic operating system (OS) program 481, and one or more Internet protocol (IP) application program(s) 482.

Mobile station 241 is capable of transmitting and receiving in two modes: IEEE 802.11 mode and CDMA2000 mode. The operating mode is controlled by basic operating system 481 and is determined by whether mobile station 241 detects an IEEE 802.11 wireless network or a CDMA200 wireless network in the local area. If mobile station 241 detects both an IEEE 802.11 wireless network and a CDMA200 wireless network, mobile station 241 operates in a preferred 802.11 mode. If the IEEE 802.11 wireless network is subsequently lost, mobile station 241 switches to CDMA2000 mode. In this way, the 802.11 access points can combine data traffic from multiple mobile stations onto a single CDMA2000 radio link, thereby conserving resources of the CDMA2000 base stations.

IEEE 802.11 transceiver 410 receives from antenna 405 an incoming RF signal transmitted by one of access points 231-234 of wireless network 200. IEEE 802.11 transceiver 410 down-converts the incoming RF signal to produce an intermediate frequency (IF) or a baseband signal. Similarly, CDMA2000 transceiver 411 receives from antenna 405 an incoming RF signal transmitted by one of base transceiver subsystems 221-223 of wireless network 200. CDMA2000 transceiver 411 down-converts the incoming RF signal to produce an intermediate frequency (IF) or a baseband signal.

The IF or baseband signal from IEEE 802.11 transceiver 410 or CDMA2000 transceiver 411 is sent to RX processing circuitry 425, which produces a processed baseband signal by filtering, decoding, and/or digitizing the baseband or IF signal to produce a processed baseband signal. RX processing circuitry 425 transmits the processed baseband signal to speaker 430 (i.e., voice data) or to main processor 440 for further processing (i.e., web browsing).

TX processing circuitry 415 receives analog or digital voice data from microphone 420 or other outgoing baseband data (i.e., web data, e-mail, interactive video game data) from main processor 440. TX processing circuitry 415 encodes, multiplexes, and/or digitizes the outgoing baseband data to produce a processed baseband or IF signal. IEEE 802.11 transceiver 410 or CDMA2000 transceiver 411 receives the outgoing processed baseband or IF signal from TX processing circuitry 415. IEEE 802.xx transceiver 410 or CDMA2000 transceiver 411 up-converts the baseband or IF signal to an RF signal that is transmitted via antenna 405.

In an advantageous embodiment of the present invention, main processor 440 is a microprocessor or microcontroller. Memory 480 is coupled to main processor 440. Memory 480 may be comprised of solid-state memory such as random access memory (RAM), various types of read-only memory (ROM), or Flash RAM. Memory 480 may also include other types of memory such as micro-hard drives or removable storage media that stores data. Main processor 440 executes basic operating system (OS) program 481 stored in memory 480 in order to control the overall operation of wireless mobile station 241. In one such operation, main processor 440 controls the reception of forward channel signals and the transmission of reverse channel signals by IEEE 802.11 transceiver 410 and CDMA2000 transceiver 411, RX processing circuitry 425, and TX processing circuitry 415, in accordance with well-known principles.

Main processor 440 is capable of executing other processes and programs resident in memory 480. Main processor 440 can move data into or out of memory 480, as required by an executing process. Main processor 440 is also coupled to I/O interface 445. I/O interface 445 provides the mobile station with the ability to connect to other devices such as laptop computers and handheld computers. I/O interface 445 is the communication path between these accessories and main controller 440.

Main processor 440 is also coupled to keypad 450 and display unit 455. The end user of mobile station 241 used keypad 450 to enter data into mobile station 241. Display 455 may be a liquid crystal display capable of rendering text and/or at least limited graphics from Web sites. Alternate embodiments may use other types of displays.

The embodiment of access point 231 illustrated above in FIG. 3 implements two internal transmitters (i.e., 802.11 transmitter block 310, CDMA transmitter block 340) and two internal receivers (i.e., 802.11 receiver block 320, CDMA receiver block 350). Adding CDMA transmitter block 340 and CDMA receiver block 350 in order to provide wireless backhaul capability increases the cost of access point (AP) 231, which is an otherwise conventional AP. The cost increase is significant, since adding CDMA transmitter block 340 and CDMA receiver block 350 is essentially the same as adding an entire cell phone (or mobile station) to AP 231. However, this cost increase may be avoided, simply by using an actual cell phone (or similar wireless mobile station) to provide a wireless backhaul capability for AP 231.

Figure 5:
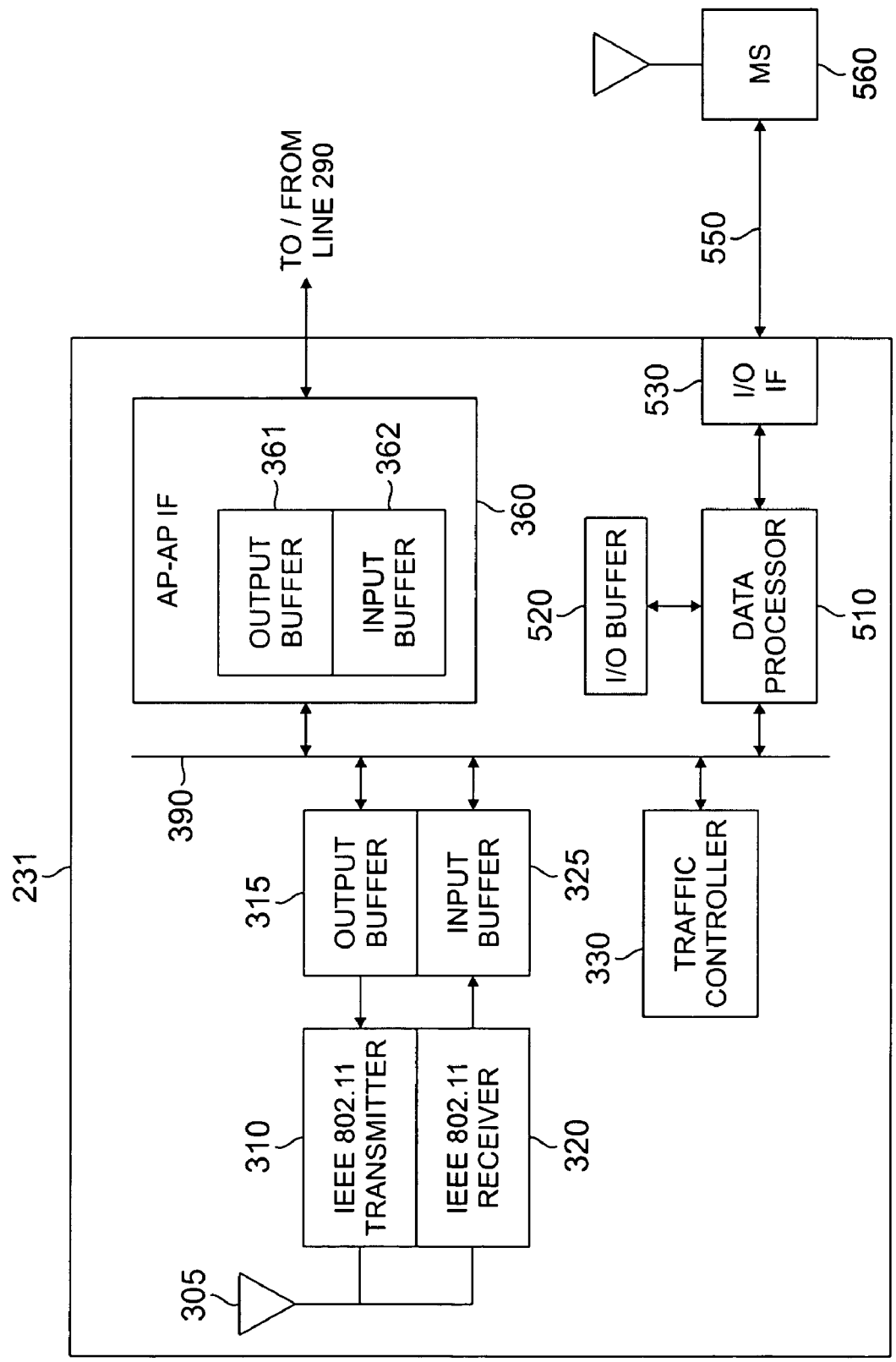
FIG. 5 illustrates in greater detail an improved access point in FIG. 2 according to an alternate embodiment of the present invention.

FIG. 5 illustrates in greater detail improved access point 231 according to an alternate embodiment of the present invention. The embodiment of access point 231 shown in FIG. 5 is similar in many respects to the embodiment shown in FIG. 3. Access point (AP) 231 comprises antenna 305, 802.11 transmitter block 310, output buffer 315, 802.11 receiver block 320, input buffer 325, and traffic controller 330. Access point 231 also comprises access point-to-access point (AP-AP) interface 360. AP-AP interface comprises output buffer 361 and input buffer 361. Output buffer 315, input buffer 325, traffic controller 330, and AP-AP interface 360 are coupled to, and communicate across, data bus 390.

The embodiment of AP 231 in FIG. 5 differs from the embodiment in FIG. 3 in that output buffer 345, input buffer 355, CDMA transmitter 340, CDMA receiver 350, and antenna 335 have been replaced by data processor 510, I/O buffer 520 and wireline input/output interface (I/O IF) 530. I/O interface 550 enables AP 231 to be connected to, and communicate with mobile station 560 via communication bus 550. Mobile station 560 then provides wireless backhaul capability for AP 231.

Under control of traffic controller 330, data processor 510 receives reverse channel data packets transmitted by MS 241-245 from 802.xx receiver 320 (or AP-AP interface 360) and internal data bus 390. Data processor may store the reverse channel data packets in I/O buffer 520. Data processor 510 transmits the reverse channel data packets via I/O interface 530 and communication bus 550 to MS 560. MS 560 then transmits the reverse channel data packets over the back haul link to one of BTS 221, 222, or 223.

Data processor 510 also receives forward channel data packets from MS 560 via I/O interface 530 and communication bus 550. Data processor 510 may store the forward channel data packets in I/O buffer 520. Data processor 510 then transmits the forward channel data packets to MS 241-245 via 802.11 receiver 320 (or AP-AP interface 360) and internal data bus 390.

The embodiment of AP 231 shown in FIG. 5 has advantages over the embodiment shown in FIG. 3. Data processor 510, I/O buffer 520, and I/O interface 530 may be implemented much more cheaply than output buffer 345, input buffer 355, CDMA transmitter 340, CDMA receiver 350, and antenna 335 from FIG. 3. Data processor 510 may be implemented by conventional data processors that are widely available and cost no more than a few dollars and possibly less than one dollar.

Also, many types of mobile stations, particularly cell phones and electronic organizers, have wireline interfaces that enable the mobile stations to be coupled to bus 550. For example, some mobile stations are capable of being mounted in a cradle in order to download data from, or upload data to, a host system, such as a personal computer (PC). It is therefore very easy and inexpensive to connect a conventional, off-the-shelf mobile station, such as MS 560, to an access point such as AP 231 in FIG. 5, in order to provide a wireless backhaul capability to AP 231.

Although the present invention has been described with an exemplary embodiment, various changes and modifications may be suggested to one skilled in the art. It is intended that the present invention encompass such changes and modifications as fall within the scope of the appended claims.

What is claimed is:

1. An access point for communicating with mobile stations located in a coverage area of an integrated wireless network, said access point comprising:
   a first transceiver configured to communicate with selected ones of said mobile stations within a short distance of said access point;
   an input/output interface coupling said access point to an external mobile station via a wireline communication bus, wherein said externally coupled mobile station is configured to communicate wirelessly with a first base station in a wireless public network portion of said integrated wireless network;
   a data processor configured to communicate with said externally coupled mobile station via said input/output interface; and
   interconnection circuitry configured to transfer data traffic between said first transceiver and said data processor, such that said access point enables said selected mobile stations to communicate with said first base station via said externally coupled mobile station.

2. The access point as set forth in claim 1 wherein said first transceiver communicates with said selected mobile stations using an IEEE 802.11 wireless protocol.

3. The access point as set forth in claim 2 wherein said externally coupled mobile station communicates with said first base station using a CDMA2000 wireless protocol.

4. The access point as set forth in claim 3 wherein said data processor is configured to receive from said first transceiver data traffic received from at least two mobile stations and to transmit said data traffic received from said at least two mobile stations to said externally coupled mobile station for subsequent transmission to said first base station in a single channel using said CDMA2000 wireless protocol.

5. The access point as set forth in claim 1 wherein said first transceiver is configured to communicate with said selected mobile stations within 500 feet of said access point.

6. The access point as set forth in claim 1 further comprising an access point-to-access point (AP-AP) interface configured to transmit to a second access point first data received from a first selected mobile station by said first transceiver, wherein said first data is directed to a second mobile station in communication with said second access point.

7. The access point as set forth in claim 6 wherein said AP-AP interface is further configured to receive second data from said second access point and to transfer said second data to said first transceiver for subsequent transmission to said first selected mobile station.

8. The access point as set forth in claim 7 wherein said AP-AP interface communicates with said second access point via a wireline link.

9. The access point as set forth in claim 7 wherein said AP-AP interface communicates with said second access point via a wireless link.

10. An integrated wireless network comprising:
a wireless public network comprising a plurality of base stations configured to communicate with mobile stations located in a coverage area of said wireless public network, wherein each of said plurality of base stations is configured to communicate with mobile stations up to several miles away, and
a wireless local area network comprising a plurality of access points configured to communicate with selected ones of said mobile stations located in a coverage area of the wireless local area network, a first one of said plurality of access points comprising:
a first transceiver configured to communicate with selected ones of said mobile stations within a short distance of said access point;
an input/output interface coupling said access point to an external mobile station via a wireline communication bus, wherein said externally coupled mobile station is configured to communicate wirelessly with a first base station in a wireless public network portion of said integrated wireless network;
a data processor configured to communicate with said externally coupled mobile station via said input/output interface; and
interconnection circuitry configured to transfer data traffic between said first transceiver and said data processor, such that said access point enables said selected mobile stations to communicate with said first base station via said externally coupled mobile station.

11. The integrated wireless network as set forth in claim 10 wherein said first transceiver communicates with said selected mobile stations using an IEEE 802.11 wireless protocol.

12. The integrated wireless network as set forth in claim 11 wherein said externally coupled mobile station communicates with said first base station using a CDMA2000 wireless protocol.

13. The integrated wireless network as set forth in claim 12 wherein said data processor is configured to receive from said first transceiver data traffic received from at least two mobile stations and to transmit said data traffic received from said at least two mobile stations to said externally coupled mobile station for subsequent transmission to said first base station in a single channel using said CDMA2000 wireless protocol.

14. The integrated wireless network as set forth in claim 10 wherein said first transceiver is configured to communicate with said selected mobile stations within 500 feet of said access point.

15. The integrated wireless network as set forth in claim 10 further comprising an access point-to-access point (AP-AP) interface configured to transmit to a second access point first data received from a, first selected mobile station by said first transceiver, wherein said first data is directed to a second mobile station in communication with said second access point.

16. The integrated wireless network as set forth in claim 15 wherein said AP-AP interface is further configured to receive second data from said second access point and to transfer said second data to said first transceiver for subsequent transmission to said first selected mobile station.

17. The integrated wireless network as set forth in claim 16 wherein said AP-AP interface communicates with said second access point via a wireline link.

18. The integrated wireless network as set forth in claim 17 wherein said AP-AP interface communicates with said second access point via a wireless link.

19. In an integrated wireless network comprising: 1) a wireless public network configured to communicate with mobile stations located in a coverage area of the wireless public network; and 2) a wireless local area network comprising a plurality of access points configured to communicate with selected ones of the mobile stations located in a coverage area of the wireless local area network, a method of operating a first one of the plurality of access points comprising:
communicating with the selected mobile stations within a short distance of the first access point via a first transceiver;
wirelessly communicating with a first one of the plurality of base stations via an external mobile station coupled to the access point via a wireline communication bus; and
transferring data traffic between the first transceiver and the externally coupled mobile station via the wireline communication bus to thereby enable the selected mobile stations to communicate with the first base station via the first access point.

20. The method as set forth in claim 19 wherein the first transceiver communicates with the selected mobile stations using an IEEE 802.11 wireless protocol.

21. The method as set forth in claim 20 wherein the externally coupled mobile station communicates with the first base station using a CDMA2000 wireless protocol.

* * * * *

UNITED STATES PATENT AND TRADEMARK OFFICE
CERTIFICATE OF CORRECTION

PATENT NO. : 7,453,858 B2 Page 1 of 1
APPLICATION NO. : 10/795117
DATED : November 18, 2008
INVENTOR(S) : John S. Csapo et al.

It is certified that error appears in the above-identified patent and that said Letters Patent is hereby corrected as shown below:

Title Page, Item (63) Under "Related U.S. Application Data", insert -- (60) provisional application No. 60/375,873, filed on April 26, 2002 --

Signed and Sealed this

Twenty-ninth Day of September, 2009

David J. Kappos
*Director of the United States Patent and Trademark Office*